United States Patent
Nakane et al.

(10) Patent No.: US 9,120,699 B2
(45) Date of Patent: Sep. 1, 2015

(54) $Li_2O$-$Al_2O_3$-$SiO_2$ BASED CRYSTALLIZED GLASS AND PRODUCTION METHOD FOR THE SAME

(75) Inventors: Shingo Nakane, Shiga (JP); Kosuke Kawamoto, Shiga (JP)

(73) Assignee: NIPPON ELECTRIC GLASS CO., LTD., Otsu-shi, Shiga (JP)

( * ) Notice: Subject to any disclaimer, the term of this patent is extended or adjusted under 35 U.S.C. 154(b) by 54 days.

(21) Appl. No.: 13/700,806

(22) PCT Filed: May 30, 2011

(86) PCT No.: PCT/JP2011/062336
§ 371 (c)(1),
(2), (4) Date: Nov. 29, 2012

(87) PCT Pub. No.: WO2011/152337
PCT Pub. Date: Dec. 8, 2011

(65) Prior Publication Data
US 2013/0085058 A1    Apr. 4, 2013

(30) Foreign Application Priority Data

May 31, 2010  (JP) .................................. 2010-123764
Jul. 12, 2010  (JP) .................................. 2010-157655
Jul. 22, 2010  (JP) .................................. 2010-164450

(51) Int. Cl.
C03C 10/12     (2006.01)
C03C 3/11      (2006.01)
C03C 1/00      (2006.01)
C03C 3/083     (2006.01)
C03C 3/04      (2006.01)
C03C 3/085     (2006.01)
C03C 3/095     (2006.01)
C03C 3/097     (2006.01)
C03C 10/00     (2006.01)

(52) U.S. Cl.
CPC . C03C 3/11 (2013.01); C03C 1/004 (2013.01); C03C 3/04 (2013.01); C03C 3/083 (2013.01); C03C 3/085 (2013.01); C03C 3/095 (2013.01); C03C 3/097 (2013.01); C03C 10/0027 (2013.01); C03C 10/0045 (2013.01)

(58) Field of Classification Search
CPC  C03C 10/0009; C03C 10/0027; C03C 3/085; C03C 3/11; C03B 32/02
USPC .................................... 501/4, 7; 65/33.7, 33.8
See application file for complete search history.

(56) References Cited

U.S. PATENT DOCUMENTS

| | | | |
|---|---|---|---|
| 4,828,595 A * | 5/1989 | Morishita et al. | 65/17.6 |
| 6,413,906 B1 * | 7/2002 | Shimatani et al. | 501/4 |
| 6,593,258 B1 * | 7/2003 | Shimatani et al. | 501/4 |
| 7,456,121 B2 * | 11/2008 | Comte | 501/4 |
| 7,465,686 B2 * | 12/2008 | Comte | 501/4 |
| 8,114,795 B2 * | 2/2012 | Yagi et al. | 501/5 |
| 8,309,480 B2 * | 11/2012 | Fujisawa et al. | 501/4 |
| 8,507,392 B2 * | 8/2013 | Yamauchi et al. | 501/4 |
| 2005/0096209 A1 | 5/2005 | Kase et al. | |
| 2005/0143246 A1 | 6/2005 | Comte et al. | |
| 2009/0162608 A1 * | 6/2009 | Yagi et al. | 428/141 |
| 2010/0069218 A1 | 3/2010 | Baldi et al. | |
| 2010/0130341 A1 | 5/2010 | Wondraczek | |
| 2011/0226231 A1 | 9/2011 | Siebers et al. | |
| 2011/0283738 A1 * | 11/2011 | Fujisawa et al. | 65/33.8 |

FOREIGN PATENT DOCUMENTS

| | | | |
|---|---|---|---|
| EP | 1435343 | * | 7/2004 |
| EP | 2284131 A1 | | 2/2011 |
| EP | 2319812 A1 | | 5/2011 |
| EP | 2322491 A1 | | 5/2011 |
| JP | H02-055243 | | 2/1990 |
| JP | 11100229 | * | 4/1999 |
| JP | 11100230 | * | 4/1999 |
| JP | H11-116265 | | 4/1999 |
| JP | 11-228180 | * | 8/1999 |
| JP | H11-228180 | | 8/1999 |
| JP | 2000-044282 A | | 2/2000 |
| JP | 2002154840 | * | 5/2002 |
| JP | 2002-293571 A | | 10/2002 |
| JP | 2004-269347 A | | 9/2004 |
| JP | 2005-041729 A | | 2/2005 |
| JP | 2005-053711 A | | 3/2005 |
| JP | 2005-093422 A | | 4/2005 |
| JP | 2006-044996 A | | 2/2006 |
| JP | 2006-265001 A | | 10/2006 |
| JP | 2007-518657 A | | 7/2007 |
| JP | 2010-001206 A | | 1/2010 |
| JP | 2010-503601 A | | 2/2010 |
| JP | 2010-064900 | | 3/2010 |
| JP | 2010-507554 A | | 3/2010 |
| JP | 4466371 | | 3/2010 |

(Continued)

OTHER PUBLICATIONS

Machine translation of JP 2002154840, May 2002.*

(Continued)

Primary Examiner — Karl Group
(74) Attorney, Agent, or Firm — Drinker Biddle & Reath LLP

(57) ABSTRACT

An object of the present invention is to provide a $Li_2O$—$Al_2O_3$—$SiO_2$ based crystallized glass with excellent bubble quality even without using $As_2O_3$ or $Sb_2O_3$ as a fining agent and a method for producing the same. The $Li_2O$—$Al_2O_3$—$SiO_2$ based crystallized glass of the present invention is a $Li_2O$—$Al_2O_3$—$SiO_2$ based crystallized glass which does not substantially comprise $As_2O_3$ and $Sb_2O_3$ and comprises at least one of Cl, $CeO_2$ and $SnO_2$, and has a S content of not more than 10 ppm in terms of $SO_3$.

18 Claims, No Drawings

(56) References Cited

FOREIGN PATENT DOCUMENTS

| JP | 2010-132541 A | 6/2010 |
| JP | 2012-505136 A | 3/2012 |
| WO | 03/104157 A1 | 12/2003 |
| WO | WO-2009/028512 A1 | 3/2009 |
| WO | 2010/026854 A1 | 3/2010 |
| WO | 2010090208 * | 8/2010 |

OTHER PUBLICATIONS

Machine translation of JP 11228180, Aug. 1999.*
Extended European Search Report dated May 8, 2014 for EP11789740.5.

\* cited by examiner

LI$_2$O-AL$_2$O$_3$-SIO$_2$ BASED CRYSTALLIZED GLASS AND PRODUCTION METHOD FOR THE SAME

TECHNICAL FIELD

The present invention relates to a Li$_2$O—Al$_2$O$_3$—SiO$_2$ based crystallized glass and a production method the same.

BACKGROUND ART

A Li$_2$O—Al$_2$O$_3$—SiO$_2$ based crystallized glass contains, as a main crystal, a β-quartz solid solution (Li$_2$O.Al$_2$O$_3$.nSiO$_2$ [n ≥2]) or a β-spodumene solid solution (Li$_2$O.Al$_2$O$_3$.nSiO$_2$ [n≥4]), and hence, it has such characteristic that expansion is extremely low and that mechanical strength is high. Therefore, the Li$_2$O—Al$_2$O$_3$—SiO$_2$ based crystallized glass has excellent thermal characteristics. In addition, since a crystal to be precipitated can be changed by changing a heat treatment condition in a crystallization step, both a transparent crystallized glass in which a β-quartz solid solution precipitates and a white opaque crystallized glass in which a β-spodumene solid solution precipitates can be produced from a mother glass (crystallizable glass) of the same composition and used for different purposes according to an application.

Making use of such characteristics, the Li$_2$O—Al$_2$O$_3$—SiO$_2$ based crystallized glass previously has been used for various applications; such as front windows of oil stoves, wood stoves, and the like, substrates for high-technology products such as color filter substrates, image sensor substrates, substrates for top plates of electromagnetic cookers, gas cookers, and the like, window glasses for fire-retarding doors, base materials for reflecting mirrors to be used for projectors such as liquid crystal projectors, or light source lamps for illumination, setters for heat treatment of electronic components or plasma display panels, trays for microwave ovens, and electronic components or precision machine components.

CITATION LIST

Patent Document

Patent Document 1: JP-A-11-228180

SUMMARY OF THE INVENTION

Problems to be Solved by the Invention

In the case of producing a crystallized glass of this kind, in view of the fact that high-temperature viscosity of the glass is high, melting at high temperatures exceeding 1,600° C. is required. In a glass with high viscosity, since bubbles are difficult to come to the surface, the bubbles in a glass melt are hardly removed. Then, As$_2$O$_3$ or Sb$_2$O$_3$ is widely used as a fining agent. Now, there is a possibility that As$_2$O$_3$ or Sb$_2$O$_3$ pollutes the environment at the time of glass producing process or waste glass treatment or the like because of high toxicity thereof. As a solution, it is investigated to use SnO$_2$, CeO$_2$, Cl, or the like in place of As$_2$O$_3$ or Sb$_2$O$_3$. For example, Patent Document 1 discloses a Li$_2$O—Al$_2$O$_3$—SiO$_2$ based crystallized glass using SnO$_2$ and Cl in combination as a fining agent.

However, there is a problem that even when SnO$_2$, CeO$_2$, Cl, or the like is used as a fining agent in place of As$_2$O$_3$ or Sb$_2$O$_3$, a Li$_2$O—Al$_2$O$_3$—SiO$_2$ based crystallized glass with excellent bubble quality is not always obtainable. In particular, this tendency conspicuously occurs in the case of producing the glass by a tank furnace for continuous production. If melting is performed using a crucible in a laboratory under a stationary condition, a glass with good bubble quality is obtained, whereas in the case of applying to a tank furnace for continuous production, in many cases, a glass with good bubble quality is not obtained.

An object of the present invention is to provide a Li$_2$O—Al$_2$O$_3$—SiO$_2$ based crystallized glass with excellent bubble quality even without using As$_2$O$_3$ or Sb$_2$O$_3$ as a fining agent and a method for producing the same.

Means for Solving the Problems

The present inventors made extensive and intensive investigations. As a result, it has been found that a reason why a Li$_2$O—Al$_2$O$_3$—SiO$_2$ based crystallized glass with excellent bubble quality is not stably obtained by using a tank furnace for continuous production resides in reboil of S (sulfur) which is incorporated from a glass raw material.

Namely, S which is incorporated from a raw material or the like is comprised as an impurity in a glass melt. In particular, there may be the case where a lot of S is comprised as an impurity in Li$_2$CO$_3$ which is used as a Li$_2$O raw material. In addition, in the Li$_2$O—Al$_2$O$_3$—SiO$_2$ based crystallized glass, since the S solubility of the glass melt is low, S is present in an instable state in the melt. Then, S is easily gasified due to a little change in the state (for example, oxidation-reduction, composition change, and temperature change). In comparison with the case where melting is performed in a stationary state as in a crucible test in a laboratory, in a tank furnace for continuous production, a fluctuation in a charging condition of the raw material or a melting condition is large, and liquation of a refractory possibly occurs. Therefore, a state change of glass is liable to occur, and reboil due to S is liable to generate, so that it is difficult to obtain a product with good bubble quality.

Even such a condition, in the case of using As$_2$O$_3$ or Sb$_2$O$_3$ as a fining agent, the S component in the glass melt is removed by a lot of a fining gas released from such a fining agent component, and the S concentration in the melt remarkably decreases. In addition, if As$_2$O$_3$ or Sb$_2$O$_3$ is present in the melt, such a fining agent component oxidizes S, thereby making S stably exist in a state of SO$_4^{2-}$ in the glass melt. Therefore, SO$_4^{2-}$ is hardly decomposed into SO$_2$ (gas)+O$_2$, so that it is possible to suppress the gasification.

However, other fining agents than As$_2$O$_3$ or Sb$_2$O$_3$ are small in an effect for removing S from the glass melt or an effect for making S stably exist in a state of SO$_4^{2-}$ in the glass melt. As a result, a so-called reboil phenomenon in which S is bubbled as a SO$_2$ gas or the like from the glass melt is easy to occur. For example, if S is gasified in an amount of 1 ppm in terms of SO$_3$, it is calculated that several thousand to several ten thousand bubbles/kg are produced. Therefore, how to prevent reboil of S from occurring is very important in obtaining a Li$_2$O—Al$_2$O$_3$—SiO$_2$ based crystallized glass with less bubbles. This importance is a phenomenon which is hardly recognized on a level of the laboratory test using a crucible (in the case of using a platinum crucible, since liquation of the crucible component hardly occurs, reboil due to S hardly occurs) and which has recognized first by the production in a tank furnace for continuous production under a condition in which As$_2$O$_3$ or Sb$_2$O$_3$ is not comprised.

The present inventors have led to a proposal of the present invention on the basis of the foregoing knowledge.

Specifically, the Li$_2$O—Al$_2$O$_3$—SiO$_2$ based crystallized glass of the present invention is characterized to be a Li$_2$O—Al$_2$O$_3$—SiO$_2$ based crystallized glass, which does not substantially comprise As$_2$O$_3$ and Sb$_2$O$_3$ and comprises at least one of Cl, CeO$_2$ and SnO$_2$, and has a S content of not more than 10 ppm in terms of SO$_3$. It is meant by the terms "not substantially comprise As$_2$O$_3$ and Sb$_2$O$_3$" as referred to in the present invention that the contents of these components are respectively not more than 100 ppm including impurities. The "Li$_2$O—Al$_2$O$_3$—SiO$_2$ based crystallized glass" means a crystallized glass comprising Li$_2$O, Al$_2$O$_3$ and SiO$_2$ as essential components, and precipitating a n-quartz solid solution and/or a β-spodumene solid solution as a main crystal. It is meant by the terms "comprises at least one of Cl, CeO$_2$ and SnO$_2$" that these components are comprised solely or in combination and that a content thereof is 0.02% by mass or more in terms of a combined content. The "S content" is a value determined by first dipping an analysis sample in Na$_2$CO$_3$ by means of alkali fusion and filtering with a filter paper, and subsequently stirring a filtrate thereof with an ion exchange resin and again filtering, followed by measuring by means of ion chromatography.

In the present invention, it is preferable to comprise Cl in an amount of from 200 to 1,500 ppm. The content of Cl is a value determined by subjecting a plate-shaped analysis sample to mirror polishing and measuring by a fluorescent X-ray analyzer.

By adopting the foregoing constitution, it is possible to obtain a crystallized glass with excellent clarity.

In the present invention, it is preferable that CeO$_2$ is not substantially comprised and SnO$_2$ is comprised in an amount of from 0.1 to 0.5% by mass. It is meant by the terms "CeO$_2$ is not substantially comprised" as referred to in the present invention that the content of CeO$_2$ is not more than 200 ppm including impurities.

In the case of using SnO$_2$ or CeO$_2$ as a fining agent, there is a concern that the crystallized glass is colored. Though details of the mechanism in which the crystallized glass is colored are unclear, it may be considered that SnO$_2$ or CeO$_2$ reduces Fe that is an impurity at the stage of a heat treatment for crystallizing a glass. In particular, as to CeO$_2$, its influence is large. Then, by adopting the foregoing constitution, it is possible to effectively prevent the coloration of the Li$_2$O—Al$_2$O$_3$—SiO$_2$ based crystallized glass from occurring. In addition, in the case of not using Cl, it becomes possible to effectively avoid corrosion of forming equipment or the like.

In addition, by adding SnO$_2$, it is possible to decrease the amount of dissolved SO$_3$ in the glass. It may be considered that this is caused due to the fact that the S component in the glass melt is removed by a fining gas released from the fining agent component. In addition, SnO$_2$ has properties of releasing a fining gas at a higher temperature than that in As$_2$O$_3$ or Sb$_2$O$_3$ and hardly releases oxygen at the initial stage of melting where the temperature is low. Namely, even if SnO$_2$ is added, the atmosphere at the initial stage of melting hardly becomes oxidative. In view of the fact that when the atmosphere at the initial stage of melting becomes oxidative, S is easily dissolved into the glass melt, so that the amount of remaining S is liable to become large, it may be considered that if SnO$_2$ is used, it is possible to effectively suppress the dissolution of S at the initial stage of melting.

In the present invention, it is preferable to comprise from 50 to 80% of SiO$_2$, from 12 to 30% of Al$_2$O$_3$, from 1 to 6% of Li$_2$O, from 0 to 5% of MgO, from 0 to 10% of ZnO, from 0 to 8% of BaO, from 0 to 5% of Na$_2$O, from 0 to 10% of K$_2$O, from 0 to 8% of TiO$_2$, from 0 to 7% of ZrO$_2$, and from 0 to 7% of P$_2$O$_5$, in terms of a percentage by mass.

According to the foregoing constitution, it is possible to easily obtain a crystallized glass in which a β-quartz solid solution or a β-spodumene solid solution precipitates as a main crystal and which is extremely low in expansion and high in mechanical strength.

In the present invention, it is preferable to comprise from 20.5 to 30% by mass of Al$_2$O$_3$ and from 0.1 to 0.5% by mass of SnO$_2$ and satisfy a relation of 3.7≤Li$_2$O+0.741MgO+0.367ZnO≤4.5 in terms of a mass ratio.

Similar to CeO$_2$, there is a concern that SnO$_2$ causes coloration of the crystallized glass. Then, in the case of using SnO$_2$ as a fining agent, by defining the composition to the foregoing range, it becomes possible to reduce the coloration problem.

In addition, the Li$_2$O—Al$_2$O$_3$—SiO$_2$ based crystallized glass of the present invention is characterized to be a Li$_2$O—Al$_2$O$_3$—SiO$_2$ based crystallized glass, which does not substantially comprise As$_2$O$_3$ and SB$_2$O$_3$, comprises Cl, and has a S content of not more than 10 ppm in terms of SO$_3$ and a β-OH value of 0.2 /mm or more. It is meant by the terms "not substantially comprise As$_2$O$_3$ and Sb$_2$O$_3$" as referred to in the present invention that the contents of these components are respectively not more than 100 ppm including impurities. The "Li$_2$O—Al$_2$O$_3$—SiO$_2$ based crystallized glass" means a crystallized glass comprising Li$_2$O, Al$_2$O$_3$ and SiO$_2$ as essential components, and precipitating a β-quartz solid solution and/or a β-spodumene solid solution as a main crystal. The "S content" is a value determined by first dipping an analysis sample in Na$_2$CO$_3$ by means of alkali fusion and filtering with a filter paper, and subsequently stirring a filtrate thereof with an ion exchange resin and again filtering, followed by measuring by means of ion chromatography. The "β-OH value" is a value calculated according to the following equation.

$$\beta\text{-OH value (/mm)} = \{\log(T3850/T3500)\}/t$$

T3850: Transmittance at 3850 cm$^-$

T3500: Lowest transmittance in an absorption band in the vicinity of 3500 cm$^{-1}$ t: Plate thickness of sample (mm)

In the present invention, it is preferable to comprise Cl in an amount of from 50 to 1,500 ppm. The content of Cl is a value determined by subjecting a plate-shaped analysis sample to mirror polishing and measuring by a fluorescent X-ray analyzer.

By adopting the foregoing constitution, it is possible to obtain a crystallized glass with excellent clarity.

In the present invention, it is preferable that CeO$_2$ is not substantially comprised, and a content of SnO$_2$ is not more than 0.5% by mass. It is meant by the terms "CeO$_2$ is not substantially comprised" as referred to in the present invention that the content of such component is not more than 200 ppm including impurities.

In the case of using SnO$_2$ or CeO$_2$ as a fining agent, there is a concern that the crystallized glass is colored. Though details of the mechanism in which the crystallized glass is colored are unclear, it may be considered that SnO$_2$ or CeO$_2$ reduces Fe that is an impurity at the stage of a heat treatment for crystallizing a glass. In particular, as to CeO$_2$, its influence is large. Then, by adopting the foregoing constitution, it is possible to effectively prevent the coloration of the Li$_2$O—Al$_2$O$_3$—SiO$_2$ based crystallized glass from occurring.

Incidentally, by adding SnO$_2$, it is possible to decrease the amount of dissolved SO$_3$ in the glass. It may be considered that this is caused due to the fact that the S component in the glass melt is removed by a fining gas released from the fining agent component. In addition, SnO$_2$ has properties of releasing a fining gas at a higher temperature than that in As$_2$O$_3$ or $Sb_2O_3$ and hardly releases oxygen at the initial stage of melting where the temperature is low. Namely, even if $SnO_2$ is added, the atmosphere at the initial stage of melting hardly becomes oxidative. In view of the fact that when the atmosphere at the initial stage of melting becomes oxidative, S is easily dissolved into the glass melt, so that the amount of remaining S is liable to become large, it may be considered that if $SnO_2$ is used, it is possible to effectively suppress the dissolution of S at the initial stage of melting.

In the present invention, it is preferable to comprise from 50 to 80% of $SiO_2$, from 12 to 30% of $Al_2O_3$, from 1 to 6% of $Li_2O$, from 0 to 5% of MgO, from 0 to 10% of ZnO, from 0 to 8% of BaO, from 0 to 5% of $Na_2O$, from 0 to 10% of $K_2O$, from 0 to 8% of $TiO_2$, from 0 to 7% of $ZrO_2$, and from 0 to 7% of $P_2O_5$, in terms of a percentage by mass.

According to the foregoing constitution, it is possible to easily obtain a crystallized glass in which a β-quartz solid solution or a β-spodumene solid solution precipitates as a main crystal and which is extremely low in expansion and high in mechanical strength.

In addition, the method for producing a $Li_2O$—$Al_2O_3$—$SiO_2$ based crystallized glass of the present invention is characterized to be a method for producing a $Li_2O$—$Al_2O_3$—$SiO_2$ based crystallized glass not substantially comprising $As_2O_3$ and $Sb_2O_3$, which comprises performing selection of a glass raw material and adjustment of a production condition so as to comprise at least one of Cl, $CeO_2$ and $SnO_2$, and have a S content of not more than 10 ppm in terms of $SO_3$. The "selection of a glass raw material" as referred to in the present invention means selection of kind, grain size, purity, and the like of the glass raw material. The "adjustment of a production condition" means adjustment of melting temperature, heating system, melting efficiency, and the like. The "Ce compound" means an oxide, a chloride, a hydroxide, a nitrate, or the like comprising a Ce element. The "Sn compound" means an oxide, a chloride, or the like comprising a Sn element.

In addition, the method for producing a $Li_2O$—$Al_2O_3$—$SiO_2$ based crystallized glass of the present invention is characterized to be a method for producing a $Li_2O$—$Al_2O_3$—$SiO_2$ based crystallized glass not substantially comprising $As_2O_3$ and $Sb_2O_3$, which comprises adding at least one of a chloride, a Ce compound and a Sn compound to a glass raw material batch, and controlling a content of S comprised in a glass raw material to not more than 150 ppm in terms of $SO_3$. The "glass raw material batch" as referred to in the present invention means a mixture excluding a chloride, a Ce compound, and a Sn compound in the glass raw material. The "content of S comprised in a glass raw material" is one, in terms of $SO_3$, with respect to a value determined by dipping an analysis sample in $Na_2CO_3$ by means of alkali fusion and filtering with a filter paper, and subsequently stirring a filtrate thereof with an ion exchange resin and again filtering, followed by measuring by means of ion chromatography.

In the present invention, it is preferable to add the chloride in an amount of from 0.04 to 0.3% by mass in terms of Cl based on 100% by mass of the glass raw material batch.

By adopting the foregoing constitution, it becomes possible to sufficiently fine the glass.

In the present invention, it is preferable that the Ce compound is not added and $SnO_2$ is comprised in an amount of from 0.1 to 0.5% by mass.

According to the foregoing constitution, it becomes easy to obtain a coloration-free $Li_2O$—$Al_2O_3$—$SiO_2$ based crystallized glass. In addition, in the case of not using Cl, it becomes possible to effectively avoid corrosion of forming equipment or the like.

In the present invention, it is preferable to compound the glass raw material batch so as to form a glass comprising from 50 to 80% of $SiO_2$, from 12 to 30% of $Al_2O_3$, from 1 to 6% of $Li_2O$, from 0 to 5% of MgO, from 0 to 10% of ZnO, from 0 to 8% of BaO, from 0 to 5% of $Na_2O$, from 0 to 10% of $K_2O$, from 0 to 8% of $TiO_2$, from 0 to 7% of $ZrO_2$, and from 0 to 7% of $P_2O_5$, in terms of a percentage by mass.

According to the foregoing constitution, it is possible to easily produce a crystallized glass in which a β-quartz solid solution or a β-spodumene solid solution precipitates as a main crystal and which is extremely low in expansion and high in mechanical strength.

In the present invention, it is preferable to compound the glass raw material batch so as to form a glass comprising from 20.5 to 30% by mass of $Al_2O_3$ and from 0.1 to 0.5% by mass of $SnO_2$, and satisfying a relation of $3.7 \leq Li_2O + 0.741\, MgO + 0.367 ZnO \leq 4.5$ in terms of a mass ratio.

According to the foregoing constitution, even in the case of using $SnO_2$ as a fining agent, it becomes possible to reduce the coloration problem. In addition, by adding $SnO_2$, it is possible to decrease the dissolved $SO_3$ amount in the glass.

In addition, the method for producing a $Li_2O$—$Al_2O_3$—$SiO_2$ based crystallized glass of the present invention is characterized to be a method for producing a $Li_2O$—$Al_2O_3$—$SiO_2$ based crystallized glass not substantially comprising $As_2O_3$ and $Sb_2O_3$, wherein a chloride is added to the glass raw material batch, and the glass raw material and/or a melting condition is adjusted such that a content of S comprised in a glass raw material is controlled to not more than 150 ppm in terms of $SO_3$, and such that a β-OH value of the obtained crystallized glass is 0.2/mm or more. The "glass raw material batch" as referred to herein means a mixture excluding a fining agent such as a chloride in the glass raw material. In addition, the "content of S comprised in a glass raw material" is one, in terms of $SO_3$, with respect to a value determined by dipping an analysis sample in $Na_2CO_3$ by means of alkali fusion and filtering with a filter paper, and subsequently stirring a filtrate thereof with an ion exchange resin and again filtering, followed by measuring by means of ion chromatography.

In the present invention, it is preferable to add the chloride in an amount of from 0.01 to 0.3% by mass in terms of Cl based on 100% by mass of the glass raw material batch.

By adopting the foregoing constitution, it becomes possible to sufficiently fine the glass.

In the present invention, it is preferable that the Ce compound is not added and the Sn compound is added as $SnO_2$ in an amount of not more than 0.5% by mass.

According to the foregoing constitution, it becomes easy to obtain a coloration-free $Li_2O$—$Al_2O_3$—$SiO_2$ based crystallized glass.

In the present invention, it is preferable to compound the glass raw material batch so as to foam a glass comprising from 50 to 80% of $SiO_2$, from 12 to 30% of $Al_2O_3$, from 1 to 6% of $Li_2O$, from 0 to 5% of MgO, from 0 to 10% of ZnO, from 0 to 8% of BaO, from 0 to 5% of $Na_2O$, from 0 to 10% of $K_2O$, from 0 to 8% of $TiO_2$, from 0 to 7% of $ZrO_2$, and from 0 to 7% of $P_2O_5$, in terms of a percentage by mass.

According to the foregoing constitution, it is possible to easily produce a crystallized glass in which a β-quartz solid solution or a β-spodumene solid solution precipitates as a main crystal and which is extremely low in expansion and high in mechanical strength.

In the present invention, it is preferable to melt the glass in a tank furnace.

According to the foregoing constitution, by applying to a tank furnace in which reboil of S is liable to occur, the effects of the present invention can be appropriately enjoyed.

Effects of the Invention

According to the present invention, in view of the fact that the content of S comprised in the crystallized glass is a few, reboil of S is hardly generated. In consequence, even when $As_2O_3$ or $Sb_2O_3$ is not comprised, it is possible to stably obtain a crystallized glass with excellent bubble quality.

In addition, by adopting a constitution in which the contents of $CeO_2$ and $SnO_2$ are controlled, it becomes easy to effectively suppress reboil while preventing coloration of the glass from occurring.

MODES FOR CARRYING OUT THE INVENTION

The $Li_2O$—$Al_2O_3$—$SiO_2$ based crystallized glass of the present invention is a glass which is preferable from the environmental standpoint because it does not substantially comprise $As_2O_3$ and $Sb_2O_3$. Then, Cl, $CeO_2$, and/or $SnO_2$ are comprised as a substitute fining agent for them.

The cause of bubbling generated in the case of not comprising $As_2O_3$ or $Sb_2O_3$ resides in the S component comprised in the glass melt. In consequence, it is desirable that the content of the S component in the glass melt is small as far as possible. In the present invention, the S content, in terms of $SO_3$, is not more than 10 ppm, preferably less than 10 ppm, not more than 8 ppm, less than 8 ppm, not more than 5 ppm, and especially preferably less than 5 ppm.

As a method for reducing the S amount in the glass, it is desirable to use a raw material with a less S component. In addition thereto, however, there may be adopted measures such as (1) a method of adding $SnO_2$, (2) a method of increasing a water content in the glass melt in the presence of Cl, (3) a method of adjusting a grain size of a $SiO_2$ raw material, (4) a method of optimizing a batch melting temperature, and (5) a method of optimizing a melting efficiency. Incidentally, details of these measures are described later.

In addition, in the $Li_2O$—$Al_2O_3$—$SiO_2$ based crystallized glass of the present invention, at least one of Cl, $CeO_2$, and $SnO_2$ can be comprised as the refining agent.

Cl has ability to sufficiently fine the glass and is preferable as the fining agent. In order to secure sufficient clarity, a content of Cl is preferably from 200 to 1,500 ppm, more preferably from 400 to 1,000 ppm, and even more preferably from 500 to 900 ppm. When the content of Cl is too small, the clarity is insufficient. On the other hand, when the content of Cl is too large, the volatilization amount as HCl is large, so that incidental equipment of the furnace is liable to be corroded.

Now, when Cl is used, there may be the case where incidental equipment of the furnace, especially forming equipment, is corroded, so that the forming efficiency is lowered. Then, in the case where it is intended to solve the corrosion problem of the forming equipment, other fining agent than Cl, namely $CeO_2$ or $SnO_2$, may be used. However, such components tend to color the glass. In particular, $CeO_2$ is larger in an influence on the coloration. Therefore, in the case where it is intended to prevent the coloration of the glass, it is preferable to comprise $SnO_2$ in an amount of from 0.1 to 0.5% by mass without substantially comprising $CeO_2$. By adopting such a constitution, for example, in the case of a transparent crystallized glass in which a β-quartz solid solution precipitates, the transmittance at 400 nm is liable to become 83% or more, and especially 85% or more at the thickness of 1.1 mm.

A suitable composition range in the $Li_2O$—$Al_2O_3$—$SiO_2$ based crystallized glass of the present invention is one comprising from 50 to 80% of $SiO_2$, from 12 to 30% of $Al_2O_3$, from 1 to 6% of $Li_2O$, from 0 to 5% of MgO, from 0 to 10% of ZnO, from 0 to 8% of BaO, from 0 to 5% of $Na_2O$, from 0 to 10% of $K_2O$, from 0 to 8% of $TiO_2$, from 0 to 7% of $ZrO_2$, and from 0 to 7% of $P_2O_5$, in terms of a percentage by mass. The reasons why the composition range is defined in this way are described below. Incidentally, the term "%" hereinafter means "% by mass" unless otherwise indicated.

$SiO_2$ is a component of forming a skeleton of the glass and constituting a crystal, and its content is from 50 to 80%, preferably from 52 to 77%, and more preferably from 54 to 75%. When the content of $SiO_2$ is too small, the coefficient of thermal expansion becomes excessively large, whereas when the content of $SiO_2$ is too large, melting of the glass becomes difficult.

$Al_2O_3$ is a component of forming a skeleton of the glass and constituting a crystal, and its content is from 12 to 30%, preferably from 13 to 28%, and more preferably from 14 to 26%. When the content of $Al_2O_3$ is too small, chemical durability is lowered, and the glass is liable to devitrify. On the other hand, when the content of $Al_2O_3$ is too large, the viscosity of the glass becomes too large, so that melting of the glass becomes difficult.

$Li_2O$ is a crystal constituent component, and it gives a large influence in crystallinity and also works to lower the viscosity of the glass. In addition, Li is combined with chlorine in the melt to become relatively stable LiCl, which volatilizes to act as a fining gas. For that reason, in the $Li_2O$—$Al_2O_3$—$SiO_2$ based crystallized glass, even when Cl is used solely as the fining agent, by comprising a large amount of $Li_2O$, it becomes possible to obtain a sufficient fining force. A content of $Li_2O$ is from 1 to 6%, preferably from 1.2 to 5.5%, and more preferably from 1.4 to 5.0%. In particular, in the case where the fining agent is Cl solely without using an oxide fining agent such as $SnO_2$ and $CeO_2$, it is preferable that the content $Li_2O$ is 3% or more. When the content of $Li_2O$ is too small, the crystallinity of the glass is so weak that the coefficient of thermal expansion becomes too large. In addition, in the case of a transparent crystallized glass, a crystal is liable to yield a white turbidity, and in the case of a white crystallized glass, a lowering of whiteness is liable to occur. In addition to this, fining with Cl solely becomes difficult. On the other hand, when the content of $Li_2O$ is too large, the crystallinity is too strong, so that the glass devitrifies, or a metastable β-quartz solid solution is not obtained, and a crystal yields a white turbidity. Thus, it may be impossible to obtain a transparent crystallized glass. Incidentally, in the case of using $SnO_2$, 2.5% or more is preferable.

A content of MgO is from 0 to 5%, preferably 0 to 4.5%, and more preferably from 0 to 4%. When the content of MgO is too large, the crystallinity becomes strong, and the amount of a precipitated crystal increases, so that the coloration by impurities becomes too strong.

A content of ZnO is from 0 to 10%, preferably 0 to 8%, more preferably from 0 to 6%, and still more preferably from 0 to 5%. When the content of ZnO is too large, the crystallinity becomes strong, and the amount of a precipitated crystal increases, so that the coloration by impurities becomes too strong.

In addition, the content of MgO and ZnO is preferably from 0 to 10%, more preferably from 0 to 8%, and even more preferably from 0 to 6% in terms of a combined content (total amount). When the combined content of these components is too large, the coloration of the crystal is liable to become strong.

A content of BaO is from 0 to 8%, preferably from 0.3 to 7%, and more preferably from 0.5 to 6%. When the content of BaO is too large, crystallization of a crystal is impaired, so that a sufficient crystal amount is not obtained, and the coefficient of thermal expansion becomes too large. Furthermore, in the case of obtaining a transparent crystallized glass, the crystal is liable to yield a white turbidity.

A content of $Na_2O$ is from 0 to 5%, preferably from 0 to 4%, and more preferably from 0 to 0.35%. When the content of $Na_2O$ is too large, the crystallinity becomes weak, so that a sufficient crystal amount is not obtained, and the coefficient of thermal expansion becomes too large. Furthermore, in the case of obtaining a transparent crystallized glass, the crystal is liable to yield a white turbidity.

A content of $K_2O$ is from 0 to 10%, preferably from 0 to 8%, more preferably from 0 to 6%, and still more preferably from 0 to 5%. When the content of $K_2O$ is too large, the crystallinity becomes weak, so that a sufficient crystal amount can not be obtained, and the coefficient of thermal expansion becomes too large. Furthermore, in the case of obtaining a transparent crystallized glass, the crystal is liable to yield a white turbidity.

In addition, the content of $Na_2O$ and $K_2O$ is preferably from 0 to 12%, more preferably from 0 to 10%, and even more preferably from 0 to 8% in terms of a combined content (total amount). When the combined content of these components is too large, the coefficient of thermal expansion is liable to become large. Furthermore, in the case of obtaining a transparent crystallized glass, the crystal is liable to yield a white turbidity.

$TiO_2$ is a nucleation agent, and its content is from 0 to 8%, preferably from 0.3 to 7%, and more preferably from 0.5 to 6%. In particular, in the case of comprising $SnO_2$, it is preferable that from 1.5 to 3%, from 1.6 to 2.5%, and especially from 1.7 to 2.3%. When the content of $TiO_2$ is too large, the coloration by impurities becomes remarkable.

$ZrO_2$ is a nucleation agent, and its content is from 0 to 7%, preferably from 0.5 to 6%, and more preferably from 1 to 5%. When the content of $ZrO_2$ is too large, not only melting of the glass becomes difficult, but devitrification tendency of the glass becomes strong.

In addition, in the case of comprising $SnO_2$, a combined content of $TiO_2$ and $ZrO_2$ is preferably from 3.8 to 5%.

$P_2O_5$ is a component for enhancing the crystallinity of the glass, and its content is from 0 to 7%, preferably from 0 to 6%, and more preferably from 0 to 5%. When the content of $P_2O_5$ is too large, the coefficient of thermal expansion becomes too large. In addition, in the case of obtaining a transparent crystallized glass, the crystal is liable to yield a white turbidity.

In the $Li_2O$—$Al_2O_3$—$SiO_2$ based crystallized glass of the present invention, it is possible to add various components other than the foregoing components. For example, each of SrO and CaO may be comprised in an amount of up to 5%, and $B_2O_3$ may be comprised in an amount of up to 10%. In addition, for example, $V_2O_5$ can be comprised as a colorant in an amount of up to 1.5%, preferably up to 1.0%, and more preferably up to 0.8%. Incidentally, in the case of comprising $SnO_2$, SrO and CaO satisfy a range of SrO+1.847CaO of preferably not more than 0.5, more preferably not more than 0.4, and especially preferably not more than 0.2. When the SrO+1.847CaO exceeds 0.5, a degree of coloration of the crystallized glass becomes large, and white turbidity is liable to generate.

Incidentally, in the present invention, as already described, for the reason from the environmental standpoint, it is important that $As_2O_3$ and $Sb_2O_3$ are not substantially comprised. Cl, $CeO_2$, and $SnO_2$ may be used as a substitute fining agent for them. Here, a combination of the fining agents may be properly selected depending upon required characteristics and the like. For example, in the case where the coloration of the glass is prevented from occurring, it is preferable to use Cl, or to use $CeO_2$ and $SnO_2$ while strictly limiting their contents. In the case where it is intended to prevent corrosion of forming equipment or the like from occurring, it is preferable to use $CeO_2$ or $SnO_2$. In the case where it is intended to prevent both coloration of the glass and corrosion of forming equipment from occurring, it is preferable to comprise only $SnO_2$ without using Cl and $CeO_2$.

Incidentally, according to investigations made by the present inventors, it has become clear that when the $Al_2O_3$ amount in a glass matrix phase (remaining glass phase) in the crystallized glass is large, the coloration due to $SnO_2$ is reduced. In order to increase the $Al_2O_3$ amount in a glass matrix phase, it is effective to increase the $Al_2O_3$ amount in a mother glass composition. However, even when only the $Al_2O_3$ amount in a mother glass composition is simply increased, there is a tendency that a large proportion of $Al_2O_3$ as increased is distributed as a crystal constituent component into a crystal phase, and the $Al_2O_3$ amount in a glass matrix phase hardly increases. Then, in the present invention, in the case of using $SnO_2$, it is desirable to increase $Al_2O_3$ and simultaneously to define $Li_2O$, MgO, and ZnO to specified ranges. This is because $Li_2O$, MgO, and ZnO tend to become crystal constituent components together with $Al_2O_3$, and by defining the contents of these components, the $Al_2O_3$ amount to be distributed into the crystal phase can be decreased. Specifically, it is preferable to comprise from 20.5 to 30% of $Al_2O_3$ and from 0.1 to 0.5% of $SnO_2$ and to adjust $Li_2O$, MgO, and ZnO to a range of $3.7 \leq Li_2O+0.741MgO+0.367ZnO \leq 4.5$ in terms of a mass ratio. By adopting this constitution, it is possible to increase the $Al_2O_3$ amount in the glass matrix phase in the crystallized glass, thereby effectively reducing the coloration due to $SnO_2$. Incidentally, the coefficients of MgO and ZnO are those for reducing the content of each of the components into a mole of $Li_2O$.

Incidentally, it is preferable that the content of $Al_2O_3$ is from 20.5 to 30%, from 21 to 28%, and especially from 21.5 to 26%.

In the foregoing constitution, when the content of $Al_2O_3$ is smaller than 20.5%, an effect of $SnO_2$ for reducing the strengthening of coloration due to $TiO_2$ and $Fe_2O_3$ is hardly obtained. On the other hand, when the content of $Al_2O_3$ is too large, the viscosity of the glass becomes too large, so that melting of the glass becomes difficult.

In the foregoing constitution, it is preferable that the content of $SnO_2$ is from 0.1 to 0.5%, from 0.1 to 0.4%, and especially from 0.1 to 0.3%. When the content of $SnO_2$ is less than 0.1%, the effect as the fining agent is hardly obtained. On the other hand, when the content of $SnO_2$ exceeds 0.5%, the coloration becomes too strong, so that the crystallized glass is liable to become yellowish. In addition, devitrification is liable to occur.

In the foregoing constitution, it is preferable that the $Li_2O+0.741$ MgO+0.367ZnO satisfies the range of from 3.7 to 4.5, from 3.8 to 4.4, and especially from 3.8 to 4.2. When the $Li_2O+0.741MgO+0.367ZnO$ exceeds 4.5, the $Al_2O_3$ amount in the glass phase in the crystallized glass decreases, so that the effect for suppressing coloration by $Al_2O_3$ is hardly obtained. On the other hand, when the $Li_2O+0.741$ MgO+ 0.367ZnO is less than 3.7, a grain diameter of a $Li_2O$—$Al_2O_3$—$SiO_2$ based crystal in the crystallized glass becomes large, so that white turbidity is liable to generate. As a result, there is a concern that a transparent feeling of the crystallized glass is impaired.

Next, the method of the present invention for producing the foregoing $Li_2O$—$Al_2O_3$—$SiO_2$ based crystallized glass is described.

First of all, a glass raw material batch is prepared so as to have a desired composition. As a glass composition, a glass comprising from 50 to 80% of $SiO_2$, from 12 to 30% of $Al_2O_3$, from 1 to 6% of $Li_2O$, from 0 to 5% of MgO, from 0 to 10% of ZnO, from 0 to 8% of BaO, from 0 to 5% of $Na_2O$, from 0 to 10% of $K_2O$, from 0 to 8% of $TiO_2$, from 0 to 7% of $ZrO_2$, and from 0 to 7% of $P_2O_5$ can be exemplified. The reasons for definition and suitable ranges with respect to this glass composition range are those as already described, and therefore, explanations thereof are omitted herein.

Furthermore, at least one of a chloride, a Ce compound, and a Sn compound is added as a fining agent to the glass raw material batch. In the case of adding a chloride, its addition amount is from 0.04 to 0.3%, preferably from 0.08 to 0.2%, and more preferably from 0.1 to 0.18% in terms of Cl based on 100% by mass of the glass raw material batch. In the case of adding a Ce compound, as to its addition amount, a content of from 0 to 0.2%, preferably from 0 to 0.15%, and more preferably from 0 to 0.1% in terms of $CeO_2$ based on 100% by mass of the glass raw material batch is added. In the case of adding a Sn compound, as to its addition amount, a content of from 0 to 0.5%, preferably from 0 to 0.3%, and more preferably from 0 to 0.2% in terms of $SnO_2$ based on 100% by mass of the glass raw material batch is added. Incidentally, as already described, it is important that $As_2O_3$ and $Sb_2O_3$ are not added to the glass raw material. In addition, in an application in which the coloration of the glass is strictly controlled, in the case of using $SnO_2$ as a fining agent, it is preferable to prepare a glass so as to comprise from 20.5 to 30% by mass of $Al_2O_3$ and from 0.1 to 0.5% by mass of $SnO_2$ and to fall within a range of $3.7 \leq Li_2O+0.741MgO+0.367ZnO \leq 4.5$. The reasons for definition and suitable ranges with respect to this glass composition range are those as already described, and therefore, explanations thereof are omitted herein.

In order that the S amount in the thus obtained glass may not be more than 10 ppm in terms of $SO_3$, the amount of S which is incorporated as an impurity in the raw material is controlled to not more than 150 ppm, preferably not more than 100 ppm, and more preferably not more than 60 ppm in terms of $SO_3$. In order to decrease the S content in the raw material, a glass raw material with high purity is selected. Measures such as a selection of a grass raw material with high purity or a pre-treatment of the glass raw material may be adopted.

Subsequently, the glass raw material is melted by melting furnace, especially a tank furnace capable of achieving continuous production. In the case of a glass of the foregoing composition, it is preferable that a melting condition is at a maximum temperature of from 1,600 to 1,800° C. for from about 20 to 200 hours.

Subsequently, the glass melt is formed into a desired shape to obtain a $Li_2O$—$Al_2O_3$—$SiO_2$ based crystallizable glass. As a forming method, various methods such as roll forming, press forming, and float forming can be adopted. The "crystallizable glass" as referred to herein means a glass being an amorphous state and having such properties that when heat treated, it precipitates a crystal from a glass matrix to become a crystallized glass.

Subsequently, a formed body consisting of a $Li_2O$—$Al_2O_3$—$SiO_2$ based crystallizable glass is held at from 700 to 800° C. for from 1 to 4 hours to achieve nucleation. In the case of obtaining a transparent crystallized glass, a heat treatment is carried out at from 800 to 950° C. for from 0.5 to 3 hours, thereby precipitating a β-quartz solid solution. In addition, in the case of obtaining a white opaque crystallized glass, after the nucleation, a heat treatment may be carried out at from 1,050 to 1,250° C. for from 0.5 to 2 hours, thereby precipitating a β-spodumene solid solution.

In this way, it is possible to obtain a $Li_2O$—$Al_2O_3$—$SiO_2$ based crystallized glass which does not substantially comprise $As_2O_3$ and $Sb_2O_3$. Incidentally, the obtained $Li_2O$—$Al_2O_3$—$SiO_2$ based crystallized glass is provided for various applications after being subjected to post processing such as cutting, polishing, bending processing and drawing forming, or being subjected to decoration on the surface.

Incidentally, as a measure for more decreasing the S amount in the crystallized glass, there may be adopted methods such as (1) a method of adding $SnO_2$, (2) a method of increasing a water content in the glass melt in the presence of Cl, (3) a method of increasing a water content in the glass melt in the presence of Cl adjusting a grain size of a $SiO_2$ raw material, (4) a method of optimizing a batch melting temperature, and (5) a method of optimizing a melting efficiency. By properly combining these methods, it becomes possible to obtain a crystallized glass with a smaller S content. Each of these methods is hereunder described in detail. (1) Method of adding $SnO_2$:

By adding $SnO_2$, it is possible to decrease the amount of dissolved $SO_3$ in the glass. It may be considered that this is caused due to the fact that the S component in the glass melt is removed by a fining gas released from the fining agent component. In addition, $SnO_2$ has properties of releasing a fining gas at a higher temperature than that in $As_2O_3$ or $Sb_2O_3$ and hardly releases oxygen at the initial stage of melting where the temperature is low. Namely, even if $SnO_2$ is added, the atmosphere at the initial stage of melting hardly becomes oxidative. In view of the fact that when the atmosphere at the initial stage of melting becomes oxidative, S is easily dissolved into the glass melt, so that the remaining S amount is liable to become large, it may be considered that if $SnO_2$ is used, it is possible to effectively suppress the dissolution of S at the initial stage of melting. In the case of adopting this method, an addition amount of $SnO_2$ is preferably not less than 0.1% by mass.

(2) Method of Adjusting a Water Content in the Glass Melt in the Presence of Cl:

According to investigations by the present inventors, different from a soda lime glass or the like having a high S solubility, in the $Li_2O$—$Al_2O_3$—$SiO_2$ based crystallized glass having a low S solubility, even by simply increasing the water content, the S content in the glass melt cannot be decreased. However, when Cl is present in the glass melt, it is possible to remarkably decrease the S content. Though details of this mechanism are unclear, it may be considered that when water and Cl are coexistent, a HCl gas is generated, and following the gas generation, S volatilizes, so that the S content in the glass melt decreases. The larger the water content in the glass melt, the higher the effect for decreasing the S amount is. In order to increase the water content in the glass melt, there can be adopted methods such as a method of using a raw material with a high water content, a method of increasing the water content in a combustion gas at the time of glass melting, and a method of bubbling a water vapor in the molten glass. In addition, the water content of the glass melt can be expressed by a β-OH value of the crystallized glass. In the present invention, the β-OH value of the crystallized glass is preferably 0.2 /mm or more, more preferably from 0.3 /mm to 4/mm, and even more preferably from 0.35 /mm to 4 /mm. In the case where the crystallized glass is opaque, it is also possible to specify it in terms of a β-OH value of the crystallizable glass. A suitable β-OH value of the crystallizable glass is preferably 0.25 /mm or more, more preferably 0.30 /mm or more, and even more preferably 0.36/mm or more.

β-OH value (/mm)={log (*T*3850/*T*3500)}/*t*

T3850: Transmittance at 3850 cm$^{-1}$
T3500: Lowest transmittance in an absorption band in the vicinity of 3500 cm$^{-1}$
t: Plate thickness of sample (mm)

(3) Method of Adjusting a Grain Size of a $SiO_2$ Raw Material

In the case of a glass with a low S solubility, such as a $Li_2O$—$Al_2O_3$—$SiO_2$ based crystallized glass, the S amount in the glass melt is influenced by a condition of initial melting at which the raw material is melted. When a dissolution process of the raw material in the $Li_2O$—$Al_2O_3$—$SiO_2$ based crystallized glass is analyzed, an initial melt with a small $SiO_2$ component is first formed, into which the $SiO_2$ raw material is then dissolved. Here, when the glass melt is reviewed from the point of view of acidity, since $SiO_2$ is a component having a high acidity, the acidity of the initial melt is low, and the acidity increases with progress of the dissolution of the $SiO_2$ raw material. In view of the fact that when the acidity of the glass is lower, S is more easily dissolved into the melt, it may be considered that when the acidity of the initial melt is lower, a glass melt comprising a lot of S is liable to be formed. In other words, so far as $SiO_2$ is liable to be dissolved at the stage of initial dissolution of the raw material, S is hardly dissolved into the glass melt. As a result, reboil due to S is hardly generated. From these reasons, it is desirable to make a grain size of the $SiO_2$ raw material small, thereby making it easy to dissolve the $SiO_2$ raw material.

Specifically, as to the $SiO_2$ raw material, one having an average grain diameter of preferably not more than 180 μm, not more than 120 μm, and especially not more than 100 μm is used. However, when the grain size of the $SiO_2$ raw material is too small, at the time of charging the raw material, only the surface is rapidly melted by radiant heat, so that the S component in the inside is hardly volatilized and scattered.

As a result, there is brought a situation that the S amount of the glass melt does not decrease. Then, it is preferable that a dissolution speed of the $SiO_2$ raw material does not become excessively high. Specifically, the average grain diameter of the $SiO_2$ raw material is preferably 45 μm or more, 50 μm or more, and especially 60 μm or more. The "average grain diameter" as referred to herein means as follows. That is, when sieves having various openings are used, proportions of grains passing through the sieves are measured, and a graph showing a relation between the opening and the proportion of grains passing through the sieve is prepared, a size of the opening of the sieve through which the grains in an amount corresponding to 50% pass is defined as the average grain diameter.

Incidentally, the method of adjusting the grain size of the $SiO_2$ raw material can also be applied to other silica glasses.

(4) Method of Optimizing a Batch Melting Temperature:

It is desirable to set a batch melting temperature preferably at a temperature of log η=2.3 to 3.0, more preferably at a temperature of log η=2.3 to 2.9, and even more preferably at a temperature of log η=2.4 to 2.9. Here, η is dPa·s. When the batch melting temperature is too high, the batch becomes in a state of being easily melted, and at the time of charging the raw material, only the surface is rapidly melted by radiant heat, so that the S component in the inside is hardly volatilized and scattered. On the other hand, when the batch melting temperature is too low, since the $SiO_2$ raw material is hardly melted, an initial melt with low acidity is formed, and the S content is liable to become high. Incidentally, the batch melting temperature can be determined by measuring a side wall in the vicinity of the glass raw material batch having been put in a glass melting furnace by using a radiation thermometer.

(5) Method of Optimizing a Melting Efficiency:

By prolonging the melting time, it becomes possible to remove unlined bubbles in the glass melt. In addition, the S amount can be decreased. However, long-term melting lowers the productivity, and it is difficult to provide an inexpensive glass. In addition, when the melting time is too long, a hetero layer is liable to be formed on the glass surface due to volatilization. As already described, in a glass with low S solubility, S is easily gasified by a slight change of the state such as a composition change. Under these circumstances, it is desirable to appropriately control the melting time. As an index of the melting time, a melting efficiency (melting area/flow rate) can be adopted. Specifically, the melting efficiency is preferably from 1.0 to 5.0 m$^2$/(t/day), and especially preferably from 1.5 to 4.5 m$^2$/(t/day).

EXAMPLES

The present invention is hereunder described by reference to the following Examples.

Example 1

Table 1 shows examples of the present invention (Samples Nos. 2 to 6 and 9 to 12) and comparative examples (Samples Nos. 1, 7, and 8).

TABLE 1

| Sample No. | 1 | 2 | 3 | 4 | 5 | 6 |
| --- | --- | --- | --- | --- | --- | --- |
| $SiO_2$ | 66 | 65.8 | 65.6 | 66 | 66 | 68 |
| $Al_2O_3$ | 23 | 23 | 23 | 23 | 23 | 23 |
| $Li_2O$ | 4 | 4 | 4 | 4 | 4 | 2 |
| MgO | 1 | 1 | 1 | 1 | 1 | 1 |
| BaO | 1.5 | 1.5 | 1.5 | 1.5 | 1.5 | 1.5 |
| $Na_2O$ | 0.5 | 0.5 | 0.5 | 0.5 | 0.5 | 0.5 |
| $TiO_2$ | 2 | 2 | 2 | 2 | 2 | 2 |
| $ZrO_2$ | 2 | 2 | 2 | 2 | 2 | 2 |
| Addition amount (% by mass) | | | | | | |
| Cl | — | — | — | 0.16 | 0.08 | 0.16 |
| $SnO_2$ | — | 0.2 | — | — | — | — |
| $CeO_2$ | — | — | 0.4 | — | — | — |
| $SO_3$ in raw material (ppm) | 120 | 120 | 120 | 120 | 120 | 120 |

TABLE 1-continued

| Analyzed value (ppm) | | | | | | |
|---|---|---|---|---|---|---|
| SO$_3$ | 14 | 7 | 9 | 3 | 5 | 8 |
| Cl | <50 | <50 | <50 | 800 | 400 | 800 |
| Analyzed value (% by mass) | | | | | | |
| SnO$_2$ | — | 0.2 | — | — | — | — |
| CeO$_2$ | — | — | 0.4 | — | — | — |
| Reboil due to stirring | Generated | Not generated | Not generated | Not generated | Not generated | Not generated |
| Number of bubbles in product (/kg) | 700 | 30 | 50 | 5 | 50 | 50 |
| β-OH (/mm) | 0.5 | 0.5 | 0.5 | 0.5 | 0.5 | 0.5 |
| Transmittance (%, at 400 nm) | 85.5 | 80 | 75 | 85 | 85 | <70 (yield white turbidity) |

| Sample No. | 7 | 8 | 9 | 10 | 11 | 12 |
|---|---|---|---|---|---|---|
| SiO$_2$ | 65.8 | 66 | 66.8 | 66.8 | 66.6 | 66.9 |
| Al$_2$O$_3$ | 23 | 23 | 23 | 23 | 23 | 23 |
| Li$_2$O | 4 | 4 | 3.5 | 3.5 | 3.5 | 3.5 |
| MgO | 1 | 1 | 0.5 | 0.5 | 0.5 | 0.5 |
| BaO | 1.5 | 1.5 | 1.5 | 1.5 | 1.5 | 1.5 |
| Na$_2$O | 0.5 | 0.5 | 0.5 | 0.5 | 0.5 | 0.5 |
| TiO$_2$ | 2 | 2 | 2 | 2 | 2 | 2 |
| ZrO$_2$ | 2 | 2 | 2 | 2 | 2 | 2 |
| Addition amount (% by mass) | | | | | | |
| Cl | 0.16 | 0.25 | — | — | — | — |
| SnO$_2$ | 0.2 | — | 0.2 | 0.2 | 0.4 | 0.1 |
| CeO$_2$ | — | — | — | — | — | — |
| SO$_3$ in raw material (ppm) | 300 | 300 | 120 | 50 | 80 | 120 |
| Analyzed value (ppm) | | | | | | |
| SO$_3$ | 11 | 11 | 6 | 3 | 2 | 9 |
| Cl | 800 | 1300 | <50 | <50 | <50 | <50 |
| Analyzed value (% by mass) | | | | | | |
| SnO$_2$ | 0.2 | — | 0.2 | 0.2 | 0.4 | 0.1 |
| CeO$_2$ | — | — | — | — | — | — |
| Reboil due to stirring | Generated | Generated | Not generated | Not generated | Not generated | Not generated |
| Number of bubbles in product (/kg) | 250 | 250 | 30 | 5 | 1 | 60 |
| β-OH (/mm) | 0.5 | 0.5 | 0.5 | 0.5 | 0.5 | 0.5 |
| Transmittance (%, at 400 nm) | 80 | 85 | 85 | 85 | 83 | 85.5 |

Each of the samples was prepared in the following manner.

First of all, silica sand, alumina, lithium carbonate, barium nitrate, magnesium oxide, sodium nitrate, titanium oxide, zirconium oxide, and the like were compounded so as to have a composition shown in Table 1 (each of the numeral values shown in Table 1 means a mass percentage). Furthermore, NaCl, SnO$_2$, and CeO$_2$ were added in proportions shown in Table, followed by uniformly mixing. Thereafter, this raw material batch was put into a refractory furnace (tank furnace for continuous production) by oxygen combustion and melted at a melting efficiency of 2.5 m$^2$/(t/day). Incidentally, the Cl amount "<50 ppm" of Samples Nos. 1 to 3 and 9 to 12 in Table shows that the Cl amount comprised as an impurity is less than 50 ppm.

Subsequently, the glass melt was stirred with a platinum stirrer and then roll formed in a thickness of 4 mm, followed by cooling to room temperature within an annealing furnace.

Thereafter, the crystallizable glass sample obtained by cutting into a prescribed length was analyzed with respect to SO$_3$ amount, Cl amount, SnO$_2$ amount, and CeO$_2$ amount in the glass. In addition, the presence or absence of the generation of reboil due to stirring was evaluated. The results are shown in Table 1.

As is evident from Table, the examples of the present invention in which the amount of SO$_3$ comprised in the raw material is not more than 150 ppm, or the SO$_3$ amount in the glass is not more than 10 ppm, the reboil due to stirring was not generated.

In addition, in the samples in which the SO$_3$ amount in the glass is less than 5 ppm, bubble in a product was distinctly few. In comparison between Samples Nos. 4 and 6 and between Samples Nos. 10 and 12, in the samples in the SO$_3$ amount in the glass is smaller, bubble in the product was few. Though the reboil is generated chiefly at the time of stirring, besides, it is also generated even slightly at an interface with the refractory or the like. It may be considered that when the SO$_3$ amount in the glass is small, this reboil generated even slightly can be suppressed. For that reason, it is understood that if the SO$_3$ amount in the glass can be controlled to less than 5 ppm, a glass with higher quality can be obtained.

Incidentally, the SO$_3$ amount in the glass is a value determined by dipping an analysis sample in Na$_2$CO$_3$ by means of alkali fusion and filtering with a filter paper, and subsequently stirring a filtrate thereof with an ion exchange resin and again filtering, followed by measuring by means of ion chromatography.

The Cl amount, the $SnO_2$ amount, and the $CeO_2$ amount in the glass were each a value determined by subjecting a plate-shaped analysis sample to mirror polishing and measuring by a fluorescent X-ray analyzer.

The presence or absence of the generation of reboil due to stirring was evaluated in the following manner. That is, a number of bubbles in each of a glass collected before stirring with the platinum stirrer and a glass after forming was calculated into a number of bubbles per kg. Then, in the case where the number of bubbles in the glass after forming was two times or more as compared with the number of bubbles in the glass before stirring, the reboil was evaluated to generate.

Bubble in the product is one obtained by irradiating light from a side face of the plate-shaped sample, visually observing bubbles, and calculating them into a number of bubbles per kg.

Subsequently, the crystallizable glass sample was put in an electric furnace and subjected to a heat treatment according to the following two schedules, respectively, thereby achieving crystallization, followed by furnace cooling.

(1) Nucleation: 780° C. for 2 hours→Crystal growth: 900° C. for 3 hours (2) Nucleation: 780° C. for 2 hours→Crystal growth: 1,160° C. for 1 hour Incidentally, the rate of temperature rise from room temperature to the nucleation temperature was set to 300° C./h, and the rate of temperature rise from the nucleation temperature to the crystal growth temperature was set to from 100 to 200° C./h.

Each of the obtained samples was evaluated with respect to the main crystal and appearance. In addition, the transparent crystallized glass sample produced according to the schedule (1) was further measured with respect to a β-OH value and a transmittance at 400 nm.

As a result, in all of the samples, when the heat treatment was carried out according to the schedule (1), a transparent crystallized glass in which a β-quartz solid solution precipitated as a main crystal was obtained. When the heat treatment was carried out according to the schedule (2), a white opaque crystallized glass in which a β-spodumene solid solution precipitated as a main crystal was obtained.

In addition, in Samples Nos. 4 and 5, each of which did not comprise $CeO_2$ and comprised 3% or more of $Li_2O$, a high transmittance was obtained. In addition, in Samples Nos. 9 to 12, as prepared in a range of 3.7≤$Li_2O$+0.741MgO+0.367ZnO≤4.5, nonetheless $SnO_2$ was comprised, a high transmittance was obtained.

Incidentally, the main crystal was evaluated using an X-ray diffraction apparatus.

The appearance was visually observed.

The β-OH value was measured with respect to a mirror polished plate-shaped sample in a thickness of 3 mm by using an infrared spectral photometer (Perkin Elmer Spectrum GX).

The transmittance at 400 nm was measured with respect to a mirror polished plate-shaped sample in a thickness of 1.1 mm by using a spectral photometer (UV3100PC).

Example 2

Table 2 shows examples of the present invention in which a n-OH value was adjusted in the presence of Cl (Samples Nos. 16 and 17) and comparative examples (Samples Nos. 13 to 15 and 18).

TABLE 2

| Sample No. | 13 | 14 | 15 | 16 | 17 | 18 |
|---|---|---|---|---|---|---|
| Raw material (ppm) | | | | | | |
| $SO_3$ | 120 | 120 | 120 | 120 | 120 | 300 |
| Cl | 80 | 800 | 1500 | 2000 | 2000 | 200 |
| Glass (ppm) | | | | | | |
| $SO_3$ | 15 | 11 | 11 | 3 | 3 | 12 |
| Cl | <50 | 400 | 800 | 800 | 800 | 100 |
| Crystallized glass (/mm) | | | | | | |
| β-OH value | 0.10 | 0.10 | 0.10 | 0.30 | 0.40 | 0.30 |
| Heating system | Electric | Electric | Electric | Oxygen & electric | Oxygen & electric | Oxygen & electric |
| Melting efficiency ($m^2$/(t/day)) | 2.5 | 2.5 | 2.5 | 2.5 | 2.5 | 2.5 |
| Reboil due to stirring | Generated | Generated | Generated | Not generated | Not generated | Generated |

Each of the samples was prepared in the following manner.

First of all, silica sand, alumina, lithium carbonate, barium nitrate, sodium nitrate, titanium oxide, zirconium oxide, and the like were compounded so as to have a composition comprising 67% of $SiO_2$, 23% of $Al_2O_3$, 4% of $Li_2O$, 1.5% of BaO, 0.5% of $Na_2O$, 2% of $TiO_2$, and 2% of $ZrO_2$ in terms of a percentage by mass and to have a S amount shown in Table 2. Furthermore, a chloride (NaCl, KCl, $BaCl_2$, and the like) was added in a chlorine proportion shown iohn Table 2, followed by uniformly mixing. Thereafter, this raw material batch was melted in a heating system and at a melting efficiency shown in Table 2. Incidentally, the Cl amount "<50 ppm" of Sample No. 13 in Table shows that the amount of Cl comprised as an impurity is less than 50 ppm. In addition, the term "electric" in Table means an electric melting system; the term "oxygen" means an oxygen combustion system; and the term describing the both means a combination of the both systems. In addition, the $SO_3$ amount in the raw material is a value determined by dipping an analysis sample in $Na_2CO_3$ by means of alkali fusion and filtering with a filter paper, and subsequently stirring a filtrate thereof with an ion exchange resin and again filtering, followed by measuring by means of ion chromatography.

Subsequently, the glass melt was stirred with a platinum stirrer and then roll formed in a thickness of 4 mm, followed by cooling to room temperature within an annealing furnace.

Thereafter, the crystallizable glass sample obtained by cutting into a prescribed length was analyzed with respect to $SO_3$ amount and Cl amount in the glass. In addition, the presence or absence of the generation of reboil due to stirring was evaluated.

Incidentally, the $SO_3$ amount in the glass is a value determined by dipping an analysis sample in $Na_2CO_3$ by means of alkali fusion and filtering with a filter paper, and subsequently stirring a filtrate thereof with an ion exchange resin and again filtering, followed by measuring by means of ion chromatography.

The Cl amount in the glass was a value determined by subjecting a plate-shaped analysis sample to mirror polishing and measuring by a fluorescent X-ray analyzer.

The presence or absence of the generation of reboil due to stirring was evaluated in the following manner. That is, a number of bubbles in each of a glass collected before stirring with the platinum stirrer and a glass after forming was calculated into a number of bubbles per kg. Then, in the case where the number of bubbles in the glass after forming was two times or more as compared with the number of bubbles in the glass collected before stirring, the reboil was evaluated to generate.

Subsequently, the crystallizable glass sample was put in an electric furnace and subjected to a heat treatment according to a schedule of performing nucleation at 780° C. for 2 hours and crystal growth at 900° C. for 3 hours (schedule 1) thereby achieving crystallization, followed by furnace cooling. Each of the thus obtained samples was measured with respect to the β-OH value. In addition, each of the obtained samples was measured with respect to the main crystal and appearance.

As a result, in all of the samples, a transparent crystallized glass in which a β-quartz solid solution precipitated as a main crystal was obtained. Furthermore, as is evident from Table 2, in Samples Nos. 16 and 17 in which the β-OH value or the S amount in the raw material was adjusted in such a manner that the S amount of the glass was not more than 10 ppm, the reboil was not generated. Incidentally, instead of the schedule 1, the heat treatment was carried out according to a schedule of performing nucleation at 780 ° C. for 2 hours and crystal growth at 1,160 ° C. for 1 hour (schedule 2). As a result, a white opaque crystallized glass in which a β-spodumene solid solution precipitated as a main crystal was obtained.

Incidentally, the β-OH value was measured with respect to a mirror polished plate-shaped sample in a thickness of 3 mm by using an infrared spectral photometer (Perkin Elmer Spectrum GX).

The main crystal was evaluated using an X-ray diffraction apparatus.

The appearance was visually observed.

In all of Schedules 1 and 2, the rate of temperature rise from room temperature to the nucleation temperature was set to 300° C./h, and the rate of temperature rise from the nucleation temperature to the crystal growth temperature was set to from 100 to 200° C./h.

Example 3

The present invention is hereunder described by reference to the following examples and comparative example.

Table 3 shows examples of the present invention (Samples Nos. 20 and 21) and a comparative example (Sample No. 19).

TABLE 3

| Sample No. | 19 | 20 | 21 |
|---|---|---|---|
| $SO_3$ in raw material (ppm) | 120 | 120 | 120 |
| Grain size of $SiO_2$ raw material (μm) | 10 | 60 | 90 |
| $SO_3$ in glass (ppm) | 16 | 9 | 7 |
| Reboil | Generated | Not generated | Not generated |

Each of the samples was prepared in the following manner.

First of all, silica sand, alumina, lithium carbonate, barium nitrate, sodium nitrate, titanium oxide, zirconium oxide, and the like were compounded so as to have a composition comprising 67% of $SiO_2$, 23% of $Al_2O_3$, 4% of $Li_2O$, 1.5% of BaO, 0.5% of $Na_2O$, 2% of $TiO_2$, and 2% of $ZrO_2$ in terms of a percentage by mass. Furthermore, NaCl was comprised in a proportion of 0.2% by mass as Cl, followed by uniformly mixing. At that time, each of raw materials having an average particle diameter shown in Table was used as the $SiO_2$ raw material.

Subsequently, this raw material batch was put into a refractory furnace (tank furnace for continuous production) by oxygen combustion and melted at a melting efficiency of 2.5 $m^2/(t/day)$. Subsequently, the glass melt was stirred with a platinum stirrer and then roll formed in a thickness of 4 mm, followed by cooling to room temperature within an annealing furnace.

Thereafter, the crystallizable glass sample obtained by cutting into a prescribed length and measured with respect to the presence or absence of the generation of reboil. The results are shown in Table 3.

As is evident from Table, in Nos. 20 and 21, the reboil due to stirring was not generated.

Incidentally, the $SO_3$ amount in each of the raw material and the glass is a value determined by dipping an analysis sample in $Na_2CO_3$ by means of alkali fusion and filtering with a filter paper, and subsequently stirring a filtrate thereof with an ion exchange resin and again filtering, followed by measuring by means of ion chromatography.

The presence or absence of the generation of reboil was decided in the following manner. That is, a number of bubbles in each of a glass collected before stirring with the platinum stirrer and a glass after forming was calculated into a number of bubbles per kg. Then, in the case where the number of bubbles in the glass after forming was two times or more as compared with the number of bubbles in the glass before stirring, the reboil was evaluated to generate.

Subsequently, the crystallizable glass sample was put in an electric furnace and subjected to a heat treatment according to the following two schedules, respectively, thereby achieving crystallization, followed by furnace cooling.

(1) Nucleation: 780° C. for 2 hours→Crystal growth: 900° C. for 3 hours (2) Nucleation: 780° C. for 2 hours→Crystal growth: 1,160° C. for 1 hour Incidentally, the rate of temperature rise from room temperature to the nucleation temperature was set to 300° C./h, and the rate of temperature rise from the nucleation temperature to the crystal growth temperature was set to from 100 to 200° C./h.

Each of the obtained samples was evaluated with respect to the main crystal and appearance. As a result, in all of the samples, when the heat treatment was carried out according to the schedule (1), a transparent crystallized glass in which a β-quartz solid solution precipitated as a main crystal was obtained. When the heat treatment was carried out according to the schedule (2), a white opaque crystallized glass in which a β-spodumene solid solution precipitated as a main crystal was obtained.

Incidentally, the main crystal was evaluated using an X-ray diffraction apparatus.

The appearance was visually observed.

While the present invention has been described in detail and with reference to specific embodiments thereof, it will be apparent to one skilled in the art that various changes and modifications can be made therein without departing from the spirit and scope of the present invention.

Incidentally, the present application is based on a Japanese patent application filed on May 31, 2010 (Japanese Patent Application No. 2010-123764), a Japanese patent application filed on Jul. 12, 2010 (Japanese Patent Application No. 2010-157655), and a Japanese patent application filed on Jul. 22, 2010 (Japanese Patent Application No. 2010-164450), the contents of which are incorporated herein by reference. In addition, all references as cited herein are incorporated as a whole.

INDUSTRIAL APPLICABILITY

The $Li_2O$—$Al_2O_3$—$SiO_2$ based crystallized glass of the present invention can be utilized for various applications. Specifically, there can be exemplified front windows of oil stoves, wood stoves, and the like, substrates for high-technology products such as color filter substrates, image sensor substrates, substrates for top plates of electromagnetic cookers, gas cookers, and the like, window glasses for fire-retarding doors, base materials for reflecting mirrors to be used for projectors such as liquid crystal projectors, or light source lamps for illumination, setters for heat treatment of electronic components or plasma display panels, trays for microwave ovens, and electronic components or precision machine components.

The invention claimed is:

1. A method for producing a $Li_2O$—$Al_2O_3$—$SiO_2$ based crystallized glass not substantially comprising $As_2O_3$ and $Sb_2O_3$, the method comprising:
   (i) preparing a glass raw material compounded so as to form a glass comprising $Li_2O$, $Al_2O_3$, and $SiO_2$, as a glass composition;
   (ii) melting the glass raw material in a tank furnace to obtain a glass melt;
   (iii) forming the glass melt into a $Li_2O$—$Al_2O_3$—$SiO_2$ based crystallized glass;
   (iv) heat treating the crystallized glass to obtain a $Li_2O$—$Al_2O_3$—$SiO_2$ based crystallized glass in which a β-quartz solid solution and/or a β-spodumene solid solution as a main crystal, said $Li_2O$—$Al_2O_3$—$SiO_2$ based crystallized glass comprising:
      (a) not more than 100 ppm $As_2O_3$ and not more than 100 ppm $Sb_2O_3$; and
      (b) at least one of: 50 to 1500 ppm Cl, not more than 200 ppm $CeO_2$, and 0.1 to 0.5% by mass $SnO_2$,
   wherein selection of the glass raw material and adjustment of a production condition are performed so that the crystallized glass has (c) a S content of 2 to 10 ppm in terms of $SO_3$ and (d) a β-OH value of 0.2 /mm or more.

2. A method for producing a $Li_2O$—$Al_2O_3$—$SiO_2$ based crystallized glass not substantially comprising $As_2O_3$ and $Sb_2O_3$, the method comprising:
   (i) preparing a glass raw material compounded so as to form a glass comprising $Li_2O$, $Al_2O_3$, and $SiO_2$ as a glass composition and limiting a content of S to 50 to 150 ppm, in terms of $SO_3$, and further comprising at least one of:
      (a) a chloride in an amount of from 0.04 to 0.3% by mass in terms of Cl based on 100% by mass of the glass raw material;
      (b) a Ce compound in an amount of from 0 to 0.2% by mass in terms of $CeO_2$ based on 100% by mass of the glass raw material; and
      (c) a Sn compound in an amount of from 0.1 to 0.5% by mass in terms of $SnO_2$ based on 100% by mass of the glass raw material;
   (ii) melting the glass raw material in a tank furnace to obtain a glass melt;
   (iii) forming the glass melt into a $Li_2O$—$Al_2O_3$—$SiO_2$ based crystallized glass;
   (iv) heat treating the crystallized glass to obtain a $Li_2O$—$Al_2O_3$—$SiO_2$ based crystallized glass in which a β-quartz solid solution and/or a β-spodumene solid solution as a main crystal, said crystallized glass comprising no more than 100 ppm $As_2O_3$; and no more than 100 ppm $Sb_2O_3$;
   wherein selection of the glass raw material and adjustment of a production condition are performed so that the crystallized glass has a β-OH value of 0.2 /mm or more.

3. The method for producing a $Li_2O$—$Al_2O_3$—$SiO_2$ based crystallized glass according to claim 1 or 2, wherein the glass raw material comprises the chloride in an amount of from 0.04 to 0.3% by mass in terms of Cl based on 100% by mass of the glass raw material.

4. The method for producing a $Li_2O$—$Al_2O_3$—$SiO_2$ based crystallized glass according to claim 1 or 2, wherein the glass raw material comprises $SnO_2$ in an amount of from 0.1 to 0.5% by mass, and no Ce compound is added.

5. The method for producing a $Li_2O$—$Al_2O_3$—$SiO_2$ based crystallized glass according to claim 1, wherein the glass raw material is compounded so as to form a glass comprising from 50 to 80% of $SiO_2$, from 12 to 30% of $Al_2O_3$, from 1 to 6% of $Li_2O$, from 0 to 5% of MgO, from 0 to 10% of ZnO, from 0 to 8% of BaO, from 0 to 5% of $Na_2O$, from 0 to 10% of $K_2O$, from 0 to 8% of $TiO_2$, from 0 to 7% of $ZrO_2$, and from 0 to 7% of $P_2O_5$, in terms of a percentage by mass.

6. The method for producing a $Li_2O$—$Al_2O_3$—$SiO_2$ based crystallized glass according to claim 1 or 2, wherein the glass raw material is compounded so as to form a glass comprising from 20.5 to 30% by mass of $Al_2O_3$ and from 0.1 to 0.5% by mass of $SnO_2$ and satisfying a relation of $3.7 \leq Li_2O + 0.741MgO + 0.367ZnO \leq 4.5$ in terms of a mass ratio.

7. The method for producing a $Li_2O$—$Al_2O_3$—$SiO_2$ based crystallized glass according to claim 1, wherein the glass raw material comprises a chloride, and a content of S of 50 to 150 ppm in terms of $SO_3$.

8. The method for producing a $Li_2O$—$Al_2O_3$—$SiO_2$ based crystallized glass according to claim 7, wherein the glass raw material comprises chloride in an amount of from 0.01 to 0.3% by mass in terms of Cl based on 100% by mass of the glass raw material.

9. The method for producing a $Li_2O$—$Al_2O_3$—$SiO_2$ based crystallized glass according to claim 7, wherein the glass raw material further comprises a Sn compound in an amount of not more than 0.5% by mass in terms of $SnO_2$, and no Ce compound is added.

10. The method for producing a $Li_2O$—$Al_2O_3$—$SiO_2$ based crystallized glass according to claim 7, wherein the glass raw material is compounded so as to form a glass comprising from 50 to 80% of $SiO_2$, from 12 to 30% of $Al_2O_3$, from 1 to 6% of $Li_2O$, from 0 to 5% of MgO, from 0 to 10% of ZnO, from 0 to 8% of BaO, from 0 to 5% of Na$_2$O, from 0 to 10% of K$_2$O, from 0 to 8% of TiO$_2$, from 0 to 7% of ZrO$_2$, and from 0 to 7% of P$_2$O$_5$, in terms of a percentage by mass.

11. The method for producing a Li$_2$O—Al$_2$O$_3$—SiO$_2$ based crystallized glass according to claim 1 or 2, wherein melting the glass raw material is performed with a melting efficiency (melting area/ flow rate) of 1.0 to 5.0 m$^2$/(t/day) in the tank furnace.

12. The method for producing a Li$_2$O—Al$_2$O$_3$—SiO$_2$ based crystallized glass according to claim 1 or 2, wherein the glass raw material is compounded so as to form a glass comprising from 20.5 to 30% of Al$_2$O$_3$, from 1.6 to 2.5% of TiO$_2$, and from 0.1 to 0.5% by mass of SnO$_2$, and satisfying a relation of 3.7≤Li$_2$O+0.741 MgO+0.367ZnO≤4.5 in terms of a mass ratio.

13. The method for producing a Li$_2$O—Al$_2$O$_3$—SiO$_2$ based crystallized glass according to claim 2, wherein the glass raw material is compounded so as to form a glass comprising from 50 to 80% of SiO$_2$, from 12 to 30% of Al$_2$O$_3$, from 1 to 6% of Li$_2$O, from 0 to 5% of MgO, from 0 to 10% of ZnO, from 0 to 8% of BaO, from 0 to 5% of Na$_2$O, from 0 to 10% of K$_2$O, from 0 to 8% of TiO$_2$, from 0 to 7% of ZrO$_2$, and from 0 to 7% of P$_2$O$_5$, in terms of a percentage by mass.

14. The method for producing a Li$_2$O—Al$_2$O$_3$—SiO$_2$ based crystallized glass according to claim 2 or 13, wherein the glass raw material is compounded so as to form a glass comprising from 20.5 to 30% of Al$_2$O$_3$, from 1.6 to 2.5% of TiO$_2$, and from 0.1 to 0.5% by mass of SnO$_2$, and satisfying a relation of 3.7≤Li$_2$O+0.741MgO+0.367ZnO≤4.5 in terms of a mass ratio.

15. A method for producing a Li$_2$O—Al$_2$O$_3$—SiO$_2$ based crystallized glass not substantially comprising As$_2$O$_3$ and Sb$_2$O$_3$, the method comprising:
   (i) preparing a glass raw material compounded so as to form a glass comprising Li$_2$O, Al$_2$O$_3$, and SiO$_2$ as a glass composition and limiting a content of S to 50 to 150 ppm in terms of SO$_3$;
   (ii) melting the glass raw material in a tank furnace to obtain a glass melt;
   (iii) forming the glass melt into a Li$_2$O—Al$_2$O$_3$—SiO$_2$ based crystallized glass;
   (iv) heat treating the crystallized glass to obtain a Li$_2$O—Al$_2$O$_3$—SiO$_2$ based crystallized glass in which a β-quartz solid solution and/or a β-spodumene solid solution as a main crystal, said Li$_2$O—Al$_2$O$_3$—SiO$_2$ based crystallized glass comprising:
      (a) not more than 100 ppm As$_2$O$_3$ and not more than 100 ppm Sb$_2$O$_3$; and
      (b) at least one of: 50 to 1500 ppm Cl, not more than 200 ppm CeO$_2$, and 0.1 to 0.5% by mass SnO$_2$,
   wherein selection of the glass raw material and adjustment of a production condition are performed so that the crystallized glass has (c) a S content of 2 to 10 ppm in terms of SO$_3$ and (d) a β-OH value of 0.2 /mm or more.

16. The method for producing a Li$_2$O—Al$_2$O$_3$—SiO$_2$ based crystallized glass according to claim 15, wherein the glass raw material is compounded so as to form a glass comprising from 50 to 80% of SiO$_2$, from 12 to 30% of Al$_2$O$_3$, from 1 to 6% of Li$_2$O, from 0 to 5% of MgO, from 0 to 10% of ZnO, from 0 to 8% of BaO, from 0 to 5% of Na$_2$O, from 0 to 10% of 1K$_2$O, from 0 to 8% of TiO$_2$, from 0 to 7% of ZrO$_2$, and from 0 to 7% of P$_2$O$_5$, in terms of a percentage by mass.

17. The method for producing a Li$_2$O—Al$_2$O$_3$—SiO$_2$ based crystallized glass according to claim 15 or 16, wherein the glass raw material is compounded so as to form a glass comprising from 20.5 to 30% of Al$_2$O$_3$, and from 0.1 to 0.5% by mass of SnO$_2$, and satisfying a relation of 3.7≤Li$_2$O+0.741MgO+0.367ZnO≤4.5 in terms of a mass ratio.

18. The method for producing a Li$_2$O—Al$_2$O$_3$—SiO$_2$ based crystallized glass according to claim 15 or 16, wherein the glass raw material is compounded so as to form a glass comprising from 20.5 to 30% of Al$_2$O$_3$, from 1.6 to 2.5% of TiO$_2$, and from 0.1 to 0.5% by mass of SnO$_2$, and satisfying a relation of 3.7≤Li$_2$O+0.741MgO+0.367ZnO≤4.5 in terms of a mass ratio.

* * * * *